United States Patent
Furusawa et al.

(10) Patent No.: US 8,229,934 B2
(45) Date of Patent: Jul. 24, 2012

(54) SYSTEM AND PROGRAM FOR COLLECTING DOCUMENTS

(75) Inventors: Osamu Furusawa, Sagamihara (JP); Masaki Komedani, Yokohama (JP); Fumihiko Terui, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 12/814,667

(22) Filed: Jun. 14, 2010

(65) Prior Publication Data

US 2011/0040789 A1 Feb. 17, 2011

(30) Foreign Application Priority Data

Aug. 14, 2009 (JP) .................................. 2009-187980

(51) Int. Cl.
*G06F 17/30* (2006.01)
(52) U.S. Cl. ......................................................... 707/741
(58) Field of Classification Search .................. 707/609, 707/695, 705, 741, 758, 802
See application file for complete search history.

(56) References Cited

U.S. PATENT DOCUMENTS

| 6,581,056 B1 * | 6/2003 | Rao | .................................. 1/1 |
| 2006/0167928 A1 * | 7/2006 | Chakraborty et al. | ........ 707/102 |
| 2009/0193210 A1 * | 7/2009 | Hewett et al. | ................. 711/163 |

FOREIGN PATENT DOCUMENTS

| JP | 2001184355 A | 7/2001 |
| JP | 2002197100 A | 7/2002 |
| JP | 2005327297 A | 11/2005 |
| JP | 2006099341 A | 4/2006 |
| JP | 2007025735 A | 2/2007 |
| JP | 2009070355 A | 4/2009 |

OTHER PUBLICATIONS

Bauer et al, A Research Agent Architecture for Real Time Data Collection and Analysis (2001), p. 61-66.*
Hitoshi Murakara, "Correct Choices of Upgrading Techniques for Oracle," DB Magazine vol. 15, No. 14, pp. 160-173, Apr. 1, 2006, SHOEISHA Co., Ltd.

* cited by examiner

*Primary Examiner* — Fred I Ehichioya
(74) *Attorney, Agent, or Firm* — Mollborn Patents, Inc.; Fredrik Mollborn (57) ABSTRACT

Methods, apparatus and systems, including computer program products for creating an index for search in a search system by collecting and analyzing documents to be searched. A first storage section stores system configuration information of the search system. A second storage section stores attribute information of a collected document and the system configuration information at the time of document collection for each document. A comparison section compares the attribute information of the documents to be collected and the system configuration information stored in the first storage section with the attribute information and the system configuration information stored in the second storage section, respectively, if forced re-collection of the documents is performed. A document collection section collects the documents according to a predetermined schedule under normal conditions and re-collects only documents for which a mismatch is detected by the comparison section in the case of forced re-collection.

15 Claims, 6 Drawing Sheets

SECOND STORAGE SECTION 202

| DOCUMENT ID | ATTRIBUTE INFORMATION | SYSTEM CONFIGURATION INFORMATION |
|---|---|---|
| DOCUMENT 1 | 2009/01/01/00:00:00 | 1.0 |
| DOCUMENT 2 | 2009/05/14/11:00:00 | 1.0 |
| DOCUMENT 3 | 2008/12/10/07:00:00 | 1.0 |
| ... | ... | ... |
| DOCUMENT n | 2009/03/20/05:00:00 | 1.0 |

SECOND STORAGE SECTION 202

| DOCUMENT ID | ATTRIBUTE INFORMATION | SYSTEM CONFIGURATION INFORMATION | |
|---|---|---|---|
| DOCUMENT 1 | 2009/01/01/00:00:00 | 2.0 | |
| DOCUMENT 2 | 2009/05/14/11:00:00 | 1.0 | ← INTERRUPTION |
| DOCUMENT 3 | 2008/12/10/07:00:00 | 1.0 | |
| ... | ... | ... | |
| DOCUMENT n | 2009/03/20/05:00:00 | 1.0 | |

SYSTEM AND PROGRAM FOR COLLECTING DOCUMENTS

CROSS-REFERENCE TO RELATED APPLICATIONS

This application is a National Counterpart Application that claims priority to Japanese Patent Application No. 2009-187980, filed on Aug. 14, 2009, and entitled "System and Program for Collecting Documents", the entire contents of which is incorporated herein by reference.

FIELD OF THE INVENTION

The present invention relates to a system and a program for collecting documents, and particularly to a system and a program capable of efficiently re-collecting all documents in the case of changing the system configuration of a search system.

BACKGROUND

In recent years, along with popularization of computers and the Internet, a huge number of unstructured documents have been made available and the necessity is increasing for a search system capable of accurately searching for required documents at high speed. Moreover, in order to provide an advanced search customization function, a document collection system (sometimes referred to as a crawler) or a text analysis system included in the search system is required to be able to change the language attribute, the collection field, mapping, search characteristics or the like in a flexible manner. If a change occurs in the system configuration, however, all documents need to be re-collected in order to reflect the change in the index information of the search system.

To make document re-collection in the search system more efficient, for example, Japanese Patent Application Publication No. 2001-184355 (hereinafter referred to as "Patent Document 1") discloses an information collection system, which sends content attribute information indicating the attributes of contents from a content server to an information collection device. The information collection device identifies content that has been updated or added in the content server, based on the received content attribute information, and sends a request to send the identified content. The content server sends the content related to the request to the information collection device.

In addition, Japanese Patent Application Publication No. 2005-327297 (hereinafter referred to as "Patent Document 2") discloses a knowledge information collection system for efficiently collecting document information to be registered in a knowledge database from a network. A web collection module uses a mode for collecting only document files updated after the previous collection time as a re-collection mode for performing re-collection processing of a group of document files, based on a specified origin address information. In this collection mode, the knowledge information collection system re-collects only document files updated after the previous collection time among the document files collected a specified number of days before the current time.

In normal re-collection processing in a search system, only the documents updated or added after the previous collection time need to be collected as described in Patent Documents 1 and 2 above. In the case of a change in the system configuration of the search system, however, all documents need to be re-collected in order to maintain the consistency of the index information within the search system. In addition, the re-collection needs to be safely completed. Thus, in the event that the forced re-collection is interrupted for some reason, the index is still inconsistent and therefore it has typically necessary to start the re-collection again. In this case, the documents collected before the interruption are collected redundantly due to the restart after the interruption, which causes an inefficient collection work. Also from the viewpoint of the collected side, the repetition of collecting the same documents leads to an unfavorable increase in load.

SUMMARY OF THE INVENTION

In one aspect, the various embodiments of the invention relate to methods and apparatus, including computer program products, for creating an index for search in a search system by collecting and analyzing documents to be searched. System configuration information of the search system is stored. Attribute information of a collected document and the system configuration information at the time of document collection for each document is stored. The attribute information of the documents to be collected and the system configuration information is compared with the attribute information and the system configuration information, respectively, in the event that forced re-collection of the documents is performed due to a change in the system configuration of the search system. The documents are collected according to a predetermined schedule under normal conditions and a re-collecting is done only for documents for which a mismatch is detected by the comparison section in the case of the forced re-collection.

In another aspect, the various embodiments of the invention relate to systems for providing a document collection system in a search system for creating an index for search by collecting and analyzing documents to be searched. In one embodiment, the document collection system includes a first storage section, a second storage section, a comparison section, and a document collection section. The first storage section stores system configuration information of the search system. The second storage section stores attribute information of a collected document and the system configuration information stored in the first storage section at the time of document collection for each document. The comparison section compares the attribute information of the documents to be collected and the system configuration information stored in the first storage section with the attribute information and the system configuration information stored in the second storage section, respectively, in the event that forced re-collection of the documents is performed due to a change in the system configuration of the search system. The document collection section collects the documents according to a predetermined schedule under normal conditions and re-collects only documents for which a mismatch is detected by the comparison section in the case of the forced re-collection.

DETAILED DESCRIPTION

In accordance with the various embodiments described herein, attribute information (for example, update date and time) of a collected document and information indicating the system configuration of a search system (hereinafter, referred to as the system configuration information) for each document is stored. The stored information is then compared with the attribute information of documents to be collected and the system configuration information, respectively, when forcibly re-collecting the documents so as to re-collect only the documents for which a mismatch is detected. This prevents the redundant re-collection that is common in conventional systems.

Figure 1:
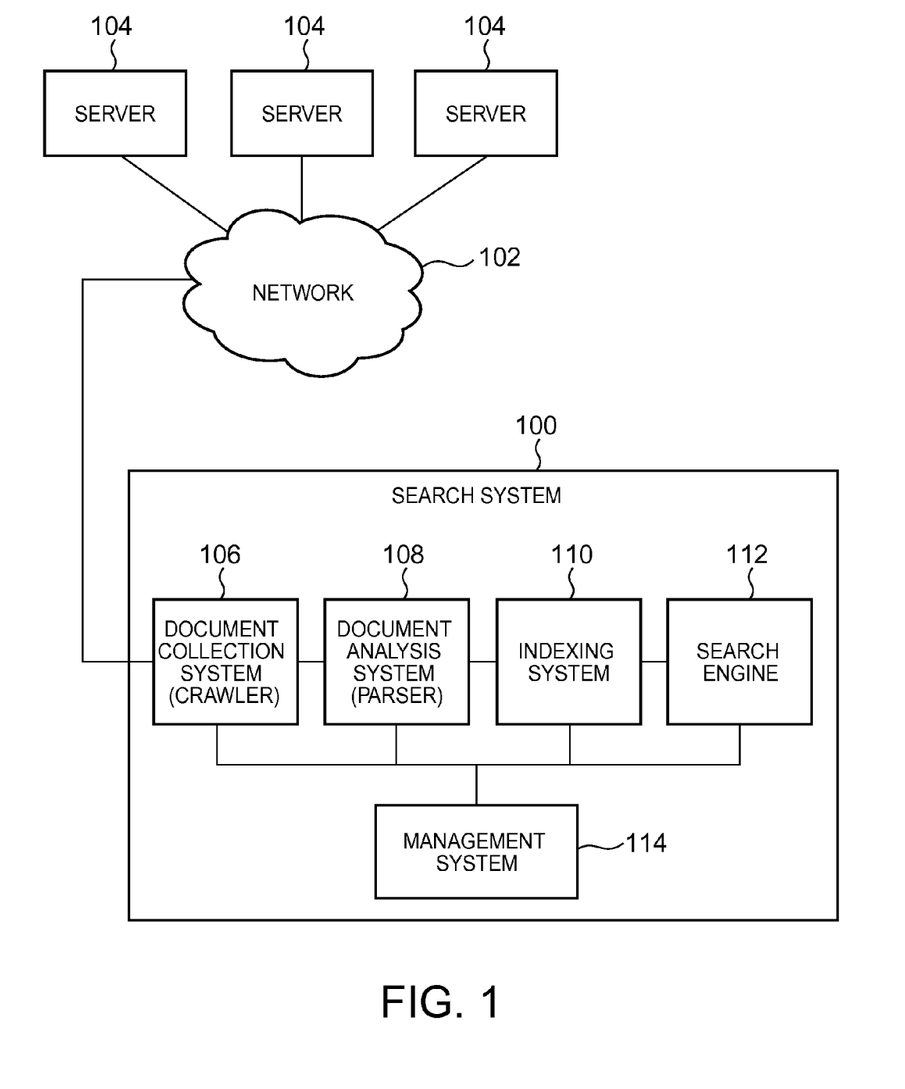
FIG. 1 is a block diagram illustrating the outline of a search system including a document collection system in accordance with one embodiment.

FIG. 1 shows the outline of a search system including a document collection system in accordance with one embodiment. The search system 100 in FIG. 1 includes a document collection system (hereinafter, referred to as the crawler) 106 for collecting documents to be searched from a large number of servers 104 connected to a network 102 such as the Internet or intranet, a document analysis system (hereinafter, referred to as the parser) 108 for analyzing the documents collected by the crawler 106 for creating an index, an indexing system 110 for creating the index of documents from an analysis result of the document analysis system 108, a search engine 112 for performing a search by using the already created index in response to a search request from a user and returning a search result to the user, and a management system 114 for controlling the components of the search system 100 in response to an instruction from the administrator of the search system 100. The management system 114 has a management console (not shown) having a display and the administrator is allowed to issue various instructions such as setting or changing the system configuration information by using the management console.

The base of the search system 100 shown in FIG. 1 is an enterprise search system described in "IBM WebSphere Information Integrator Administering Enterprise Search Version 8.3" (hereinafter referred to as "Non-patent Document 1"), which is retrievable at http://publibfp.boulder.ibm.com/epubs/pdf/c1892832.pdf It should however be realized that the search system 100 may be based on any other existing search system.

The server 104 functions as a search target system which stores documents to be searched. For example, the server 104 is a Web server if the network 102 is the Internet and is an enterprise server which stores enterprise information such as personnel information in a database if the network 102 is an intranet. The crawler 106 stores the attribute information of a collected document and the system configuration information of the search system 100 at the time of document collection for each document as described in detail later. The components constituting the search system 100, other than the crawler 106, may be components used in an existing system such as the enterprise search system.

Figure 2:
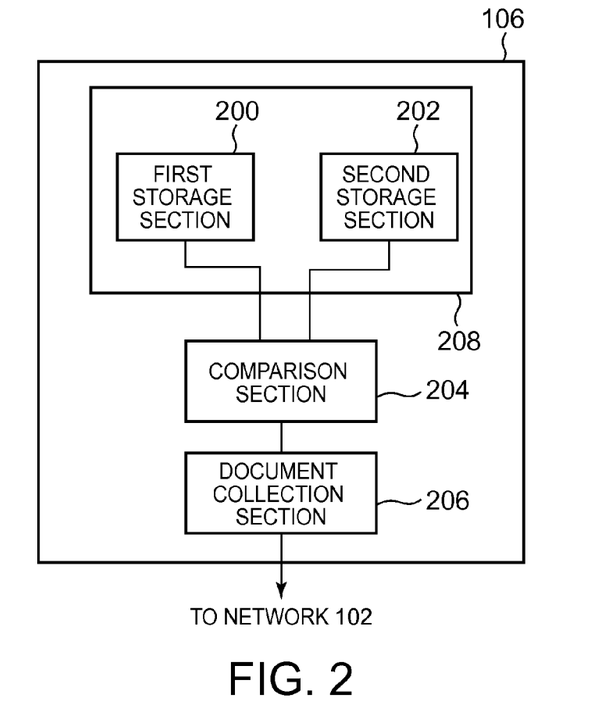
FIG. 2 is a block diagram illustrating a configuration example of the document collection system in accordance with one embodiment.

FIG. 2 shows a configuration example of the crawler 106 in accordance with one embodiment. The crawler 106 in FIG. 2 includes a first storage section 200 which stores the system configuration information of the search system 100, a second storage section 202 which stores the attribute information of a collected document and the system configuration information stored in the first storage section 200 at the time of document collection for each document, a comparison section 204 which compares the attribute information of documents to be collected and the system configuration information stored in the first storage section 200 with the attribute information and the system configuration information stored in the second storage section 202, respectively, in the case of executing forced re-collection of the documents due to a change in the system configuration of the search system 100, and a document collection section 206 which collects documents according to a predetermined schedule under normal conditions and re-collects only documents for which a mismatch is detected by the comparison section 204 in the case of forced re-collection.

The first storage section 200 and the second storage section 202 may be, as shown, a part of a common storage device 208, and the storage device 208 may also be a shared storage device to which the crawler 106, the parser 108, the indexing system 110, the search engine 112, and the management system access in common.

In this embodiment, the first storage section 200 stores the system configuration information set by the administrator of the search system 100 on the management system 114. The administrator is allowed to set the system configuration information from the display screen of a management console (not shown) included in the management system 114. Note that the system configuration information in this context means configuration information which causes a change in the documents within the search system. For example, the system configuration information includes collection field control (a list of fields input to the search system 100), field mapping (mapping between the field names in the server 104 which is a search target system and the field names in the search system 100), field search characteristics (a list of field search characteristics such as full-text search available or numeric value search available), language attributes (language information used in the parser 108), the configuration information of the parser 108 (a ranking control parameter, the configuration of additional analysis functions, and the like), and the date and time when the forced re-collection is explicitly requested. On the other hand, the conditions for limiting sets of collected documents such as the specification of an excluded document type or the WHERE clause of an SQL statement in a database do not cause a change in already collected documents within the search system 100. Therefore, even if a change occurs in these conditions, forced re-collection is not required.

Figure 3:
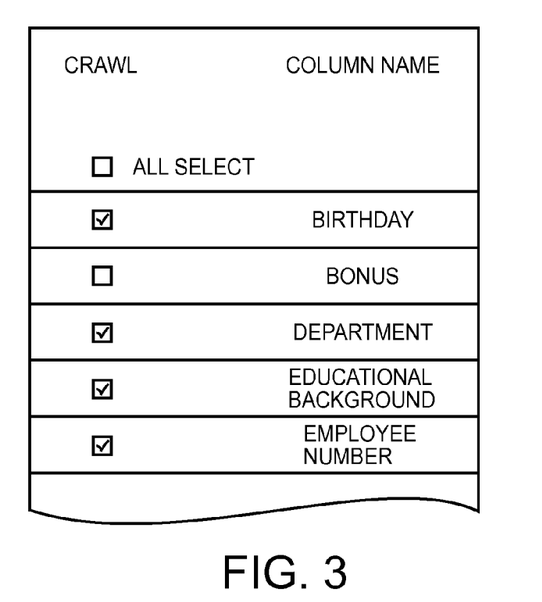
FIG. 3 is a diagram illustrating an example of a display screen for a case where the search system administrator sets system configuration information in accordance with one embodiment.

FIG. 3 shows an example of a display screen for a case where the administrator of the search system 100 sets the system configuration information. The display screen in FIG. 3 is used to specify the collection field control described above and shows information to be collected from an enterprise personnel information database. In FIG. 3, the "crawl" section is for use in specifying which column (field) of information is to be collected. If the "All Select" box is checked, information in the five columns shown on the right-hand side is all collected. In the example shown in FIG. 3, the columns named "birthday", "department", "educational background", and "employee number" are checked, and therefore the information of these four columns is collected. The setting of other system configuration information is available in the same manner.

The management system 114 stores the system configuration information set by the administrator into the first storage section 200. If the administrator changes the system configuration information after the storing, the management system 114 rewrites the system configuration information in the first storage section 200 according to a change instruction from the administrator. From the aspect of the memory capacity, preferably the system configuration information stored in the first storage section is not information itself set by the administrator, but is a value indicating the feature of the information (hereinafter, referred to as the feature value), and the feature value is changed to a unique value every time the system configuration information changes. For example, the feature value 1.0 is used when the administrator first sets the system configuration information and subsequently the feature value may be incremented by one every time the system configuration information changes.

Figure 4:
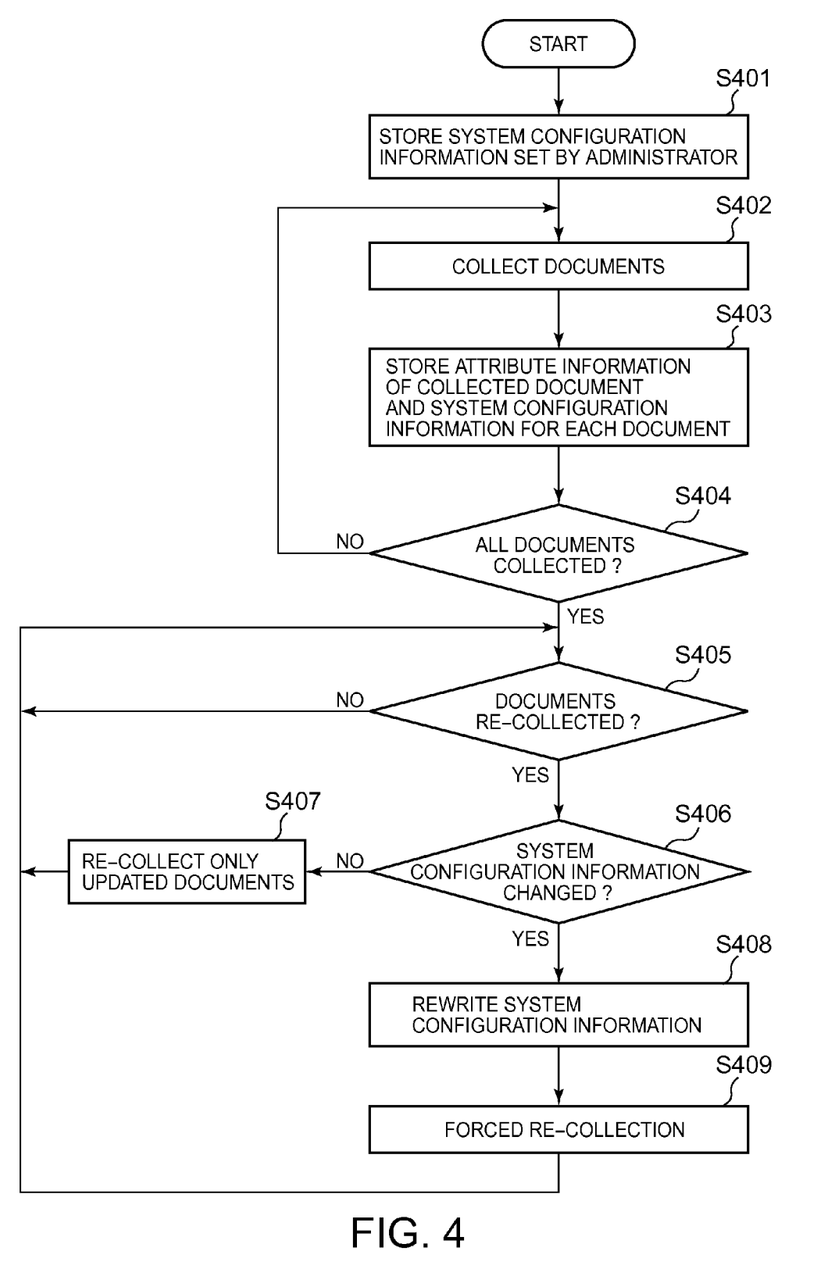
FIG. 4 is a flowchart illustrating the operation of the document collection system in accordance with one embodiment.

Then, the operation of the crawler 106 according to one embodiment will be described below with reference to the flowchart of FIG. 4. In the first step S401, the management system 114 stores the system configuration information set by the administrator into the first storage section 200. In this embodiment, the feature value 1.0 is stored as the system configuration information into the first storage section 200 as described above. In the next step S402, the document collection section 206 of the crawler 106 collects the documents from the server 104 along with the attribute information according to the system configuration information stored in the first storage section. In the next step S403, the document collection section 206 stores the attribute information of the collected documents and the system configuration information stored in the first storage section 200 into the second storage section 202. The documents themselves collected by the document collection section 206 are sent to the parser 108 for analysis. In this regard, the collected documents may be stored into a third storage section (not shown) of the storage device 208. Unless the collection of all documents is completed in the next step S404, the document collection section 206 returns to the step S402 to collect the next document. After the completion of the collection, the control proceeds to step S405.

Figure 5:
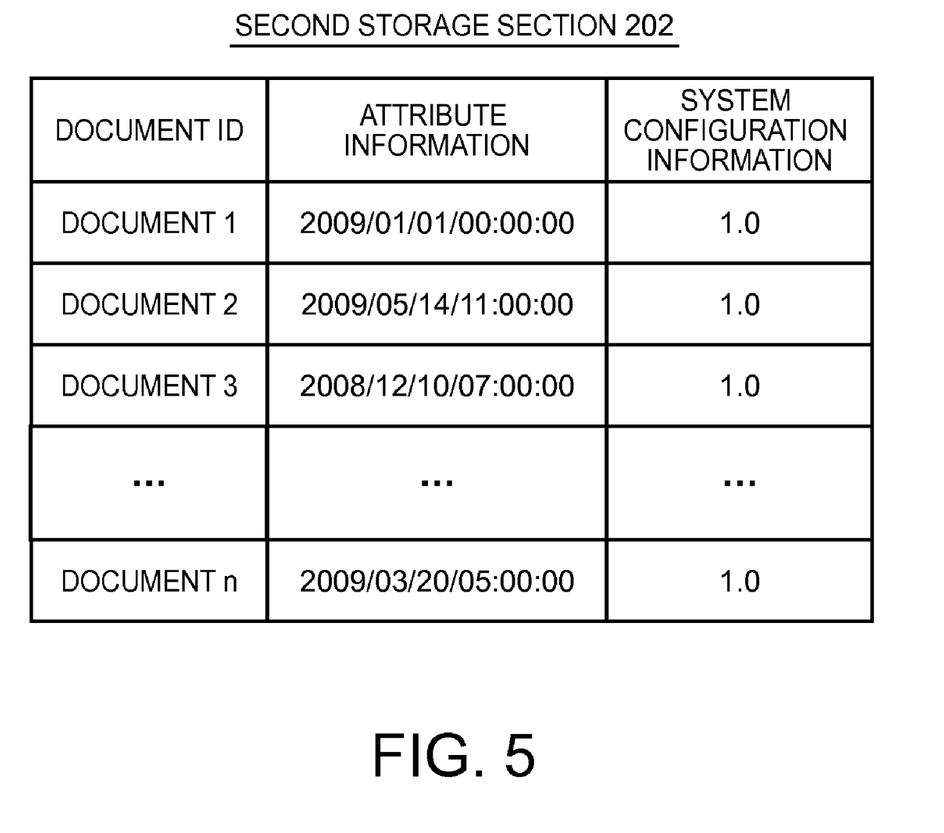
FIG. 5 is a diagram illustrating an example of document IDs, attribute information, and system configuration information stored in a second storage section when the document collection system first collects all documents in accordance with one embodiment.

FIG. 5 shows an example of the contents stored in the second storage section 202 when the document collection section 206 first collected all documents. The second storage section 202 stores the attribute information of a collected document and the system configuration information at the time of document collection for each document. In the example shown in FIG. 5, the second storage section 202 stores the attribute information representing the date and time when the document is updated and the system configuration information stored in the first storage section 200 in association with an identifier "document i (i=1, 2, 3, - - - n)" indicating an already collected document.

Returning to FIG. 4, upon the completion of the first collection of all documents, the document collection section 206 re-collects documents according to a schedule set by the administrator. For example, if the administrator has previously made a setting to re-collect documents at midnight every day, the document collection section 206 waits until midnight in step S405 and performs document re-collection at midnight unless the system configuration information is changed (step S406). In this embodiment, the document collection section 206 re-collects only updated documents in step S407. As described in Patent Document 1, the re-collection is able to be performed by retrieving only the attribute information (the update date and time in this embodiment) with respect to each document i (i=1, 2, 3, . . . n) from the server 104 which is a document owner, comparing the attribute information with the attribute information stored in the second storage section 202, and sending a request to obtain a corresponding document to the document owner server 104 if the attribute information retrieved from the document owner server 104 is different from the attribute information stored in the second storage section 202.

The crawler 106 repeats the above steps S405 and S407 in the step S406 until the system configuration information is changed. If the administrator changes the system configuration information from a management console (not shown) of the management system 114, the system configuration information stored in the first storage section 200 is rewritten by the management system 114 in step S408 (the feature value is incremented in this embodiment). In response thereto, the crawler 106 performs the forced re-collection of the already collected documents in the next step S409.

Figure 6:
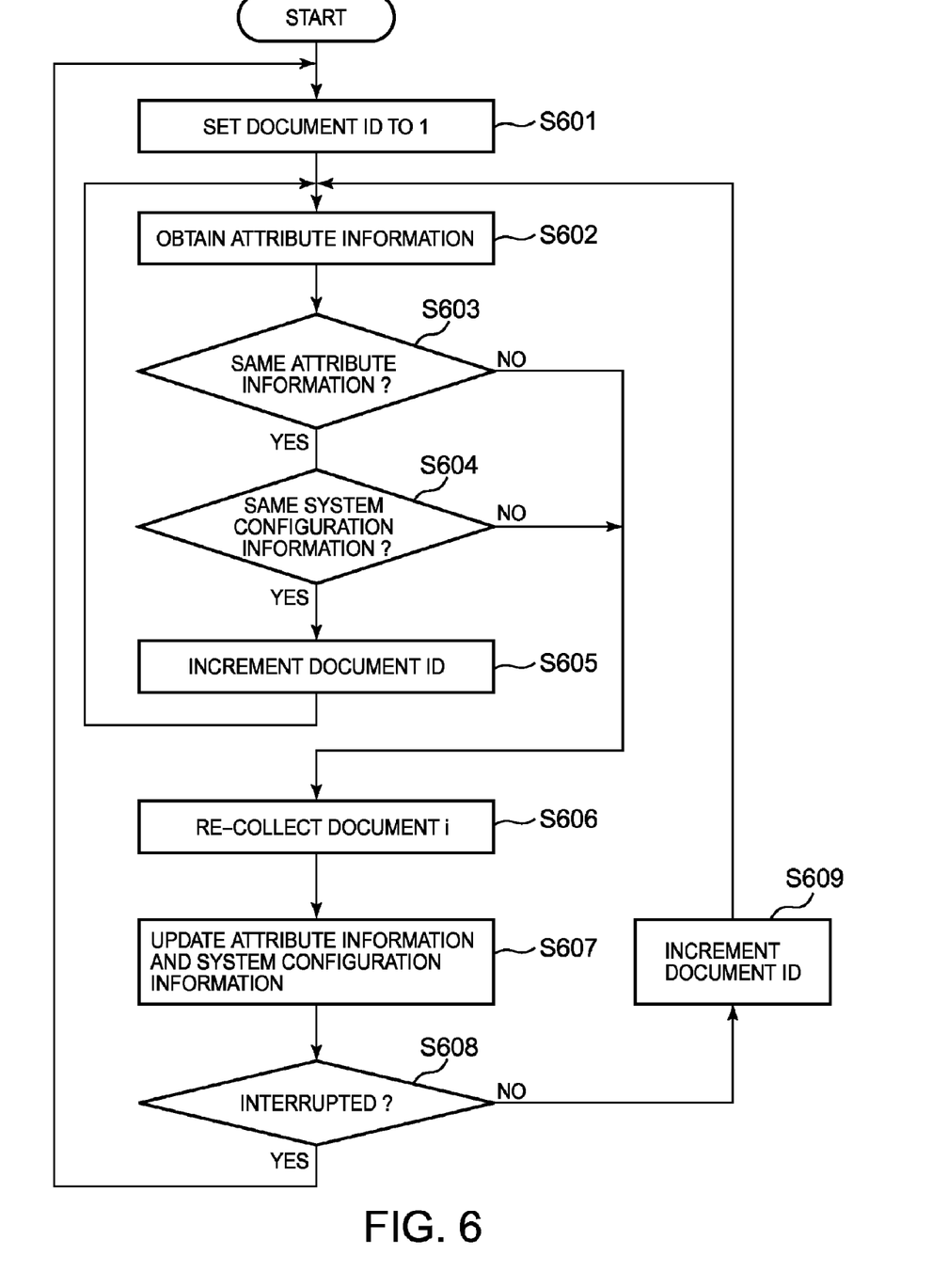
FIG. 6 is a flowchart illustrating the operation of the document collection system to perform forced re-collection in accordance with one embodiment.

FIG. 6 shows an example of a flow of the forced re-collection step S409 performed by the crawler 106. In order to forcibly re-collect all the collected documents, the document collection section 206 of the crawler 106 sets the document ID to 1 in the first step S601 and obtains attribute information of the document 1 from the server 104 having the document 1 in the next step S602. In the next step S603, the comparison section 204 of the crawler 106 compares the obtained attribute information with the attribute information stored in the second storage section 202. If the both attribute information match each other, the control proceeds to step S604 to compare the system configuration information stored in the first storage section 200 with the system configuration information of the document 1 stored in the second storage section 202.

The document collection section 206 performs step S605 or S606 according to a comparison result of the comparison section 204. In other words, if there is no change in both of the attribute information and the system configuration information, the document collection section 206 increments the document ID by one in the step S605. Thereafter, the control returns to the step S602 to obtain the attribute information of the next document. If at least one of the attribute information and the system configuration information is changed, the document collection section 206 re-collects the document 1 in the step S606.

After the re-collection of the document 1, the document collection section 206 updates the system configuration information on the document 1 stored in the second storage section 202 with the system configuration information stored in the first storage section 200 in the next step S607. If the control comes to the step S607 from the NO path of the step S603, the document collection section 206 also updates the attribute information on the document 1 with the attribute information obtained in the step S602.

Unless the forced re-collection is interrupted (step S608), the crawler 106 increments the document ID by one in the step S609 and then returns to the step S602 to repeat the above operation for the next document. If the forced re-collection is interrupted for some reason, the crawler 106 returns to the first step S601 to restart the forced re-collection from the beginning. In the past, all of the documents re-collected before the interruption were also re-collected after the interruption. According to the various embodiments described herein, however, the re-collected documents do not need to be re-collected unless the attribute information is updated after the interruption.

Figure 7:
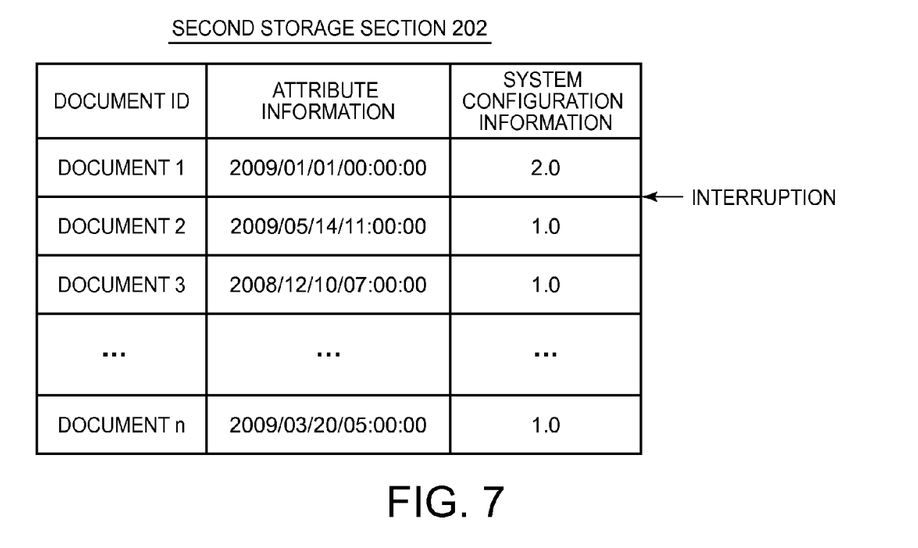
FIG. 7 is a diagram illustrating an update content of the second storage section when the execution of the forced re-collection is interrupted in accordance with one embodiment.

For example, assume that an interruption occurs after the forced re-collection of the document 1. FIG. 7 shows the contents stored in the second storage section 202 in this situation. As shown, the system configuration information of the document 1 is updated from 1.0 to 2.0 in the step S607 of FIG. 6 at the time of the forced re-collection, while the system configuration information of other documents is still 1.0. If the forced re-collection is restarted from the step S601 of FIG. 6 in this state, the control branches to the YES path in the steps S603 and S604 with respect to the document 1 and therefore the re-collection step S606 is not performed for the document 1. As for the document 2 and the subsequent documents, the system configuration information remains to be old and therefore the comparison result of the step S604 is NO, by which the re-collection is performed in the step S606.

As described above, according to the various embodiments, if all documents are forcibly re-collected after the system configuration information is changed, the documents re-collected before the interruption of the forced re-collection are not re-collected redundantly in the restart after the interruption unless the attribute information is changed. If an attempt is made to re-collect all documents forcibly by one crawler, however, redundant forced re-collection may be made in some cases. For example, if the administrator of the search system 100 changes the system configuration information by checking the "All Select" box on the display screen shown in FIG. 3, affected by the change are only documents collected from the server which manages the personnel information. The Web server on the Internet is unrelated to the personnel information and therefore there is no change in the index even if the documents are forcibly re-collected from the Web server, which ends up redundant forced re-collection. Therefore, in order to perform the forced re-collection efficiently, it is preferable to provide the crawler 106 for each collection target server (data source). The data source includes, for example, IBM® DB2® Universal Database, IBM® Lotus Notes® database, Microsoft® Windows® file system, UNIX® file system, and Web sites on the Internet. It should be noted that, these are illustrative only and the collection targets of the crawler of the various embodiments are not limited to them.

Lastly, a brief description will be given below about post processing of the search system 100 performed after the crawler 106 collects or re-collects documents from the respective servers 104. First, the parser 108 analyzes documents collected by the crawler 106 and prepares for creating the index of the documents as described in Non-patent Document 1. For example, the parser 108 extracts texts from the documents collected by the crawler 106, detects the source languages of the documents, analyzes the documents according to an analysis rule specified by the administrator, and stores the analysis result into the shared storage device 208 in preparation for creating the index by the indexing system 110.

The indexing system 110 creates an index by using the analysis result from the parser 108 and stores the index into the shared storage device 208 (which may be a dedicated index database). Normally, the indexing system 110 executes an index creation task according to a regular schedule and adds information on a new document and on a changed document to the index. In the case of any forced re-collection as described above, the indexing system 110 reads all data re-collected by the crawler 106 and analyzed by the parser 108 and reorganizes the index to recreate the entire index.

The search engine 112 performs a search on the basis of the index created by the indexing system 110 according to a search request from a user and returns a search result to the user.

Figure 8:
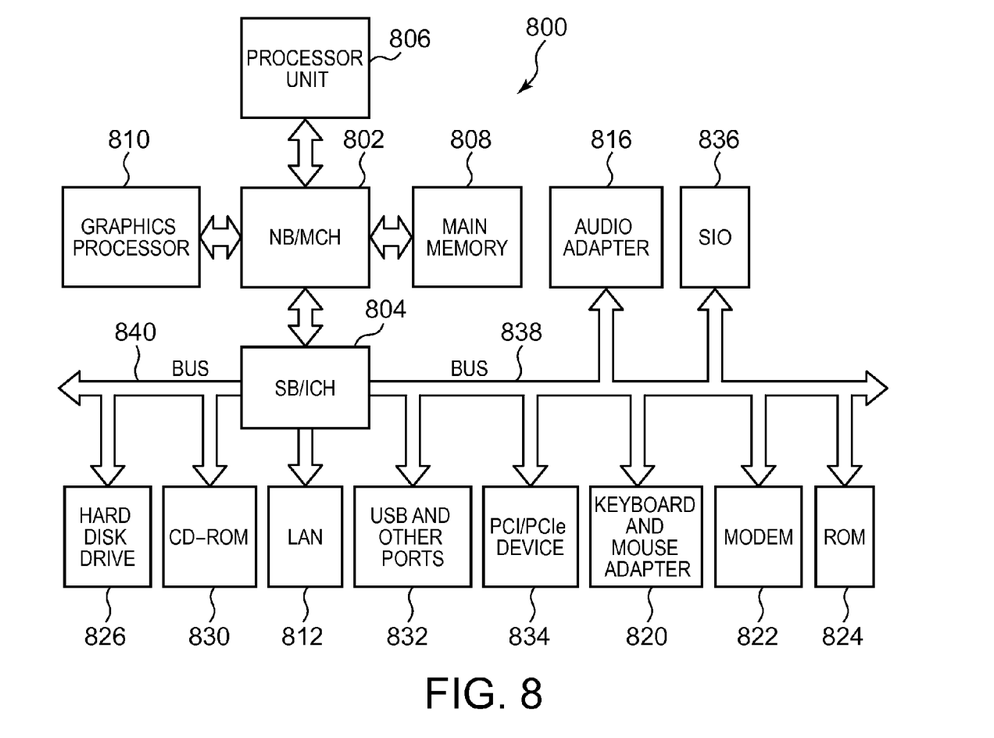
FIG. 8 is a block diagram illustrating a configuration example of a data processing system usable as the search system including the document collection system in accordance with one embodiment.

FIG. 8 shows an example of a data processing system which may be implemented as the search system 100 including the crawler 106 according to the one embodiment. A hub architecture used by a data processing system 800, which is shown, includes a north bridge/memory controller hub (NB/MCH) 802 and a south bridge/input-output controller hub (SB/ICH) 804. The NB/MCH 802 is connected to a processor unit 806, a main memory 808, and a graphics processor 810. It is also possible to connect the graphics processor 810 to the NB/MCH 802 via an accelerated graphic port (AGP).

In the shown example, a LAN adapter 812 is connected to an SB/ICH 804. Moreover, an audio adapter 816, a keyboard and mouse adapter 820, a modem 822, a read-only memory (ROM) 824, a hard disk drive (HDD) 826, a CD-ROM drive 830, a universal serial bus (USB) port and other communication ports 832, and a PCI/PCIe device 834 are connected to the SB/ICH 804 via a bus 838 and a bus 840. The PCI/PCIe device 834 is able to include, for example, an Ethernet adapter, an add-in card, and a PC card for a notebook computer. The ROM 824 is able to be, for example, a flash binary input/output system (BIOS).

The hard disk drive 826 and the CD-ROM drive 830 are connected to the SB/ICH 804 via the bus 840 and, for example, an IDE or SATA interface is able to be used therefor. It is also possible to connect a super I/O (SIO) device 836 to the SB/ICH 804.

An operating system runs on the processor unit 806 to control various components within the data processing system 800. The operating system may be a commercially available operating system such as Windows® XP of Microsoft Corporation or the like. It is possible to run an application program for controlling the crawler 106, the parser 108, the indexing system 110, the search engine 112, and the management system 114 on the operating system. The processor unit 806 may be a symmetric multiprocessor system including a plurality of processors. Alternatively, the processor unit 806 may be a single processor system.

Instructions for the operating system and the application program are stored in a storage device such as the hard disk drive 826 and loaded to the main memory 808 at the time of execution by the processor unit 806.

The hardware in FIG. 8 may be changed according to the state of implementation. In addition to or instead of the shown hardware, it is possible to use a flash memory, a nonvolatile memory, an optical disk drive, or any other peripheral device. An example shown in FIG. 8 is not intended to limit the architecture.

While the various embodiments have been described in the context of a fully functioning data processing system, the program capable of embodying the various embodiments may be distributed in the form of a computer-readable medium of instructions and a variety of forms is equally applicable regardless of a particular type of signal bearing media actually used to carry out the distribution. Examples of computer-readable media include recordable-type media, such as a flexible disk, a hard disk drive, a RAM, a CD-ROM, and a DVD-ROM, and transmission-type media, such as a digital or analog communication link and a wired or wireless communication link using a radio frequency and a lightwave transmission. The computer-readable media may take the form of coded formats which are decoded for actual use in a particular data processing system.

The above description has been provided for the purpose of illustration and description, and is not intended to be exhaustive or limited to the embodiments in the form disclosed. It is apparent to those skilled in the art that various modifications or alterations may be made to the foregoing. These embodiments were chosen and described in order to best explain the principle and practical application of the various embodiments, and to enable those skilled in the art to understand the invention for various embodiments with various modifications as are suited to the particular use contemplated.

The invention claimed is:

1. In a search system for creating an index for search by collecting and analyzing documents to be searched, a document collection system for collecting the documents, comprising:
    a processor;
    a memory storing instructions to be executed by the processor;
    a first storage section storing system configuration information of the search system;
    a second storage section storing attribute information of a collected document and the system configuration information stored in the first storage section at the time of document collection for each document;
    a comparison section comparing the attribute information of the documents to be collected and the system configuration information stored in the first storage section with the attribute information and the system configuration information stored in the second storage section, respectively, in the event that forced re-collection of the documents is performed due to a change in the system configuration of the search system;
    a document collection section collecting the documents according to a predetermined schedule under normal conditions and for re-collecting only documents for which a mismatch is detected by the comparison section in the case of the forced re-collection;
    a document analysis system analyzing the documents collected by the document collection system;
    an indexing system creating the index of the documents from an analysis result of the document analysis system;
    a search engine performing a search by using the created index in response to a search request from a user and returning a search result to the user; and
    a management system controlling the document collection system, the document analysis system, the indexing system, and the search engine according to an instruction from an administrator of the search system.

2. The document collection system according to claim 1, further comprising a management system rewriting the system configuration information stored in the first storage section in response to an instruction from an administrator of the search system to the management system of the search system to change the system configuration.

3. The document collection system according to claim 2, wherein a feature value uniquely indicating the change in the system configuration is used as the system configuration information stored in the first storage section.

4. The document collection system according to claim 1, wherein the second storage section is operable to store the attribute information and the system configuration information in association with identifiers indicating the already collected documents.

5. The document collection system according to claim 1, wherein the document collection system is provided for each server which is a document owner.

6. A computer program product for creating an index for search in a search system by collecting and analyzing documents to be searched, the computer program product comprising:
    a computer readable storage medium having computer readable program code embodied therewith, the computer readable program code comprising:
    computer readable program code configured to store system configuration information of the search system;
    computer readable program code configured to store attribute information of a collected document and the system configuration information at the time of document collection for each document;
    computer readable program code configured to compare the attribute information of the documents to be collected and the system configuration information with the attribute information and the system configuration information, respectively, in the case where forced re-collection of the documents is performed due to a change in the system configuration of the search system;
    computer readable program code configured to collect the documents according to a predetermined schedule under normal conditions and for re-collecting only documents for which a mismatch is detected by the comparison section in the case of the forced re-collection;
    computer readable program code configured to analyze the collected documents;
    computer readable program code configured to create the index of the documents from an analysis result;
    computer readable program code configured to perform a search by using the created index in response to a search request from a user and returning a search result to the user; and
    computer readable program code configured to control the document collection, the document analysis, the indexing, and the search according to an instruction from an administrator of the search system.

7. The computer program product according to claim 6, further comprising computer readable program code configured to rewrite the system configuration information in response to the change in the system configuration of the search system.

8. The computer program product according to claim 7, wherein a feature value uniquely indicating the change in the system configuration is used as the system configuration information.

9. The computer program product according to claim 6, further comprising computer readable program code configured to store the attribute information and the system configuration information in association with identifiers indicating the already collected documents.

10. The computer program product according to claim 6, wherein the document collection is provided for each server which is a document owner.

11. A method for creating an index for search in a search system by collecting and analyzing documents to be searched, comprising:
    storing system configuration information of the search system;
    storing attribute information of a collected document and the system configuration information at the time of document collection for each document;
    comparing the attribute information of the documents to be collected and the system configuration information with the attribute information and the system configuration information, respectively, in the case where forced re-collection of the documents is performed due to a change in the system configuration of the search system;

collecting the documents according to a predetermined schedule under normal conditions and re-collecting only documents for which a mismatch is detected by the comparison in the case of the forced re-collection;

analyzing the collected documents;

creating an index of the documents from an analysis result of the document analysis;

performing a search by using the created index in response to a search request from a user and returning a search result to the user; and controlling document collection, document analysis, indexing, and search according to an instruction from an administrator of the search system.

12. The method according to claim 11, further comprising: rewriting the system configuration information in response to the change in the system configuration of the search system.

13. The method according to claim 12, wherein a feature value uniquely indicating the change in the system configuration is used as the system configuration information.

14. The method according to claim 11, further comprising: storing the attribute information and the system configuration information in association with identifiers indicating the already collected documents.

15. The method according to claim 11, wherein the document collection is provided for each server which is a document owner.

* * * * *